United States Patent
Cagle et al.

(10) Patent No.: US 12,272,834 B2
(45) Date of Patent: Apr. 8, 2025

(54) WEARABLE DEVICE HAVING BATTERY PACK BANK AND ADAPTOR

(71) Applicant: TECHTRONIC CORDLESS GP, Anderson, SC (US)

(72) Inventors: Clint Cagle, Easley, SC (US); Adam Faulkner, Greenville, SC (US); Raony Barrios, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/651,851

(22) Filed: May 1, 2024

(65) Prior Publication Data

US 2024/0283076 A1 Aug. 22, 2024

Related U.S. Application Data

(63) Continuation of application No. 17/932,192, filed on Sep. 14, 2022, now Pat. No. 12,080,905.

(51) Int. Cl.
*H01M 50/00* (2021.01)
*B25F 5/00* (2006.01)
(Continued)

(52) U.S. Cl.
CPC ............. *H01M 50/244* (2021.01); *B25F 5/00* (2013.01); *H01M 10/0525* (2013.01);
(Continued)

(58) Field of Classification Search
CPC .. H01M 50/24; H01M 50/204; H01M 50/244; H01M 50/247; H01M 50/256; B25F 3/00
See application file for complete search history.

(56) References Cited

U.S. PATENT DOCUMENTS 2,304,367 A 12/1942 Meyer et al.
4,160,857 A 7/1979 Nardella et al.
(Continued)

FOREIGN PATENT DOCUMENTS

CN 102263217 A 11/2011
CN 107732056 A 2/2018
(Continued)

OTHER PUBLICATIONS

Extended European Search Report for Application No. 23194781.3 dated May 2, 2024 (9 pages).

*Primary Examiner* — Eyamindae C Jallow
(74) *Attorney, Agent, or Firm* — Michael Best & Friedrich LLP

(57) ABSTRACT

A system including a power tool, a device, one or more battery packs, a battery pack bank, and an adaptor. The power tool has a power tool battery receptacle. The device is wearable by a user and has a first device battery receptacle and a second device battery receptacle. The one or more battery packs are received by at least one selected from a group of the power tool battery receptacle, the first device battery receptacle, and the second device battery receptacle. The battery pack bank is on the device. The adaptor includes a user interface and an adapter interface, the adapter interface is received by the power tool battery receptacle, the adapter configured to supply power, via the first device battery receptacle, when the user interface is in a first mode, and supply power, via the second device battery receptacle, when the user interface is in a second mode.

17 Claims, 8 Drawing Sheets

(51) Int. Cl.
*H01M 10/0525* (2010.01)
*H01M 10/44* (2006.01)
*H01M 10/46* (2006.01)
*H01M 50/204* (2021.01)
*H01M 50/244* (2021.01)
*H01M 50/247* (2021.01)
*H02J 7/00* (2006.01)
*A01G 20/47* (2018.01)

(52) U.S. Cl.
CPC ........... *H01M 10/44* (2013.01); *H01M 10/46* (2013.01); *H01M 50/204* (2021.01); *H01M 50/247* (2021.01); *H02J 7/0013* (2013.01); *H02J 7/0045* (2013.01); *A01G 20/47* (2018.02); *H01M 2220/30* (2013.01)

(56) References Cited

U.S. PATENT DOCUMENTS

| | | | |
|---|---|---|---|
| 4,748,344 | A | 5/1988 | Sing |
| 5,211,321 | A | 5/1993 | Rodriguez |
| 5,680,026 | A | 10/1997 | Lueschen |
| 6,007,940 | A | 12/1999 | Spotnitz |
| 6,106,971 | A | 8/2000 | Spotnitz |
| 6,615,930 | B2 | 9/2003 | Bongers-Ambrosius et al. |
| 7,015,675 | B1 | 3/2006 | Andre |
| 7,629,766 | B2 | 12/2009 | Sadow |
| 8,410,756 | B2 | 4/2013 | Sakakibara et al. |
| 9,035,596 | B2 | 5/2015 | Sugiura et al. |
| 9,391,305 | B2 | 7/2016 | Yoshinari et al. |
| 9,667,006 | B2 | 5/2017 | Waigel et al. |
| 9,748,532 | B2 | 8/2017 | Takano et al. |
| 10,230,077 | B2 | 3/2019 | Rief et al. |
| D851,591 | S | 6/2019 | Mehra et al. |
| 10,892,449 | B2 | 1/2021 | Yamaoka et al. |
| 10,892,626 | B2 | 1/2021 | Rief et al. |
| 2002/0097321 | A1 | 7/2002 | McBride |
| 2006/0244414 | A1 | 11/2006 | Lay |
| 2010/0320969 | A1 | 12/2010 | Sakakibara et al. |
| 2012/0048588 | A1* | 3/2012 | Iyoda .................... H01M 50/20 173/217 |
| 2012/0052356 | A1* | 3/2012 | Sugiura ............... H01M 50/244 429/100 |
| 2015/0042280 | A1 | 2/2015 | Rief et al. |
| 2015/0044519 | A1 | 2/2015 | Rief et al. |
| 2015/0050531 | A1 | 2/2015 | Felser et al. |
| 2015/0050532 | A1 | 2/2015 | Waigel et al. |
| 2017/0222196 | A1 | 8/2017 | Ji |
| 2020/0011317 | A1* | 1/2020 | Haas ..................... F04B 53/007 |
| 2020/0113317 | A1 | 4/2020 | Okumi et al. |
| 2020/0119318 | A1* | 4/2020 | Okuoka .............. H01M 50/271 |

FOREIGN PATENT DOCUMENTS

| | | |
|---|---|---|
| CN | 107732057 A | 2/2018 |
| CN | 108232056 A | 6/2018 |
| CN | 105762313 B | 4/2019 |
| CN | 109950965 A | 6/2019 |
| CN | 214068787 U | 8/2021 |
| CN | 113506943 A | 10/2021 |
| CN | 215993043 U | 3/2022 |
| DE | 8421255 U1 | 10/1984 |
| DE | 3421832 A1 | 12/1985 |
| DE | 4301508 A1 | 7/1994 |
| EP | 3270437 A1 | 1/2018 |
| GB | 2231711 A1 | 11/1990 |
| GB | 2305110 B | 4/2000 |
| JP | S63266761 A | 11/1988 |
| JP | 2000133222 A | 5/2000 |
| JP | 2000164182 A | 6/2000 |
| WO | 9847404 A1 | 10/1998 |

\* cited by examiner

WEARABLE DEVICE HAVING BATTERY PACK BANK AND ADAPTOR

RELATED APPLICATIONS

This application is a continuation application of, and claims priority to, U.S. patent application Ser. No. 17/932,192, filed Sep. 14, 2022, the entire content of which is hereby incorporated by reference.

FIELD OF THE DISCLOSURE

The present disclosure relates to wearable devices, and more particularly to wearable devices including battery pack banks (or receptacles) and adaptors.

SUMMARY OF THE DISCLOSURE

Wearable devices (e.g., belts, harnesses, backpacks, etc.) may include power sources (e.g., battery packs) and various adaptors to couple to power tools. Power tools may operate using power supplied from the power sources of wearable devices to reduce the overall weight of the power tool, however known designs may be met with power supply, power control, and size constraints.

The disclosure provides, in one aspect, a system including a power tool, a device, one or more battery packs, a battery pack bank, and an adaptor. The power tool includes a power tool battery receptacle. The device is wearable by a user, the device having a first device battery receptacle and a second device battery receptacle. The one or more battery packs are received by at least one selected from a group of the power tool battery receptacle, the first device battery receptacle, and the second device battery receptacle. The battery pack bank is located on the device. The adaptor includes a user interface and an adapter interface, the adapter interface is received by the power tool battery receptacle, the adapter configured to supply power, via the first device battery receptacle, when the user interface is in a first mode, and supply power, via the second device battery receptacle, when the user interface is in a second mode.

The disclosure provides, in another aspect, a method for switching between one or more battery packs of a system. The system includes a power tool, a device, one or more battery packs, a battery pack bank, and an adaptor. The power tool includes a power tool battery receptacle. The device is wearable by a user, the device having a first device battery receptacle and a second device battery receptacle. The one or more battery packs are received by at least one selected from a group of the power tool battery receptacle, the first device battery receptacle, and the second device battery receptacle. The battery pack bank is located on the device. The adaptor includes a user interface and an adapter interface, the adapter interface is received by the power tool battery receptacle, the method comprising: supplying power, via the first device battery receptacle, when the user interface is in a first mode; and supplying power, via the second device battery receptacle, when the user interface is in a second mode.

The disclosure provides, in another aspect, a device including a first device battery receptacle, a second device battery receptacle, a battery pack bank, and an adaptor. The device is wearable by a user. One or more battery packs are received by at least one selected from a group of the first device battery receptacle and the second device battery receptacle. The battery pack bank is located within the device. The adaptor is connected to the device, the adaptor including a user interface. The adapter configured to supply power, via the first device battery receptacle, when the user interface is in a first mode, and supply power, via the second device battery receptacle, when the user interface is in a second mode.

Other aspects of the disclosure will become apparent by consideration of the detailed description and accompanying drawings.

Before any embodiments of the disclosure are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways.

DETAILED DESCRIPTION

Figure 1:
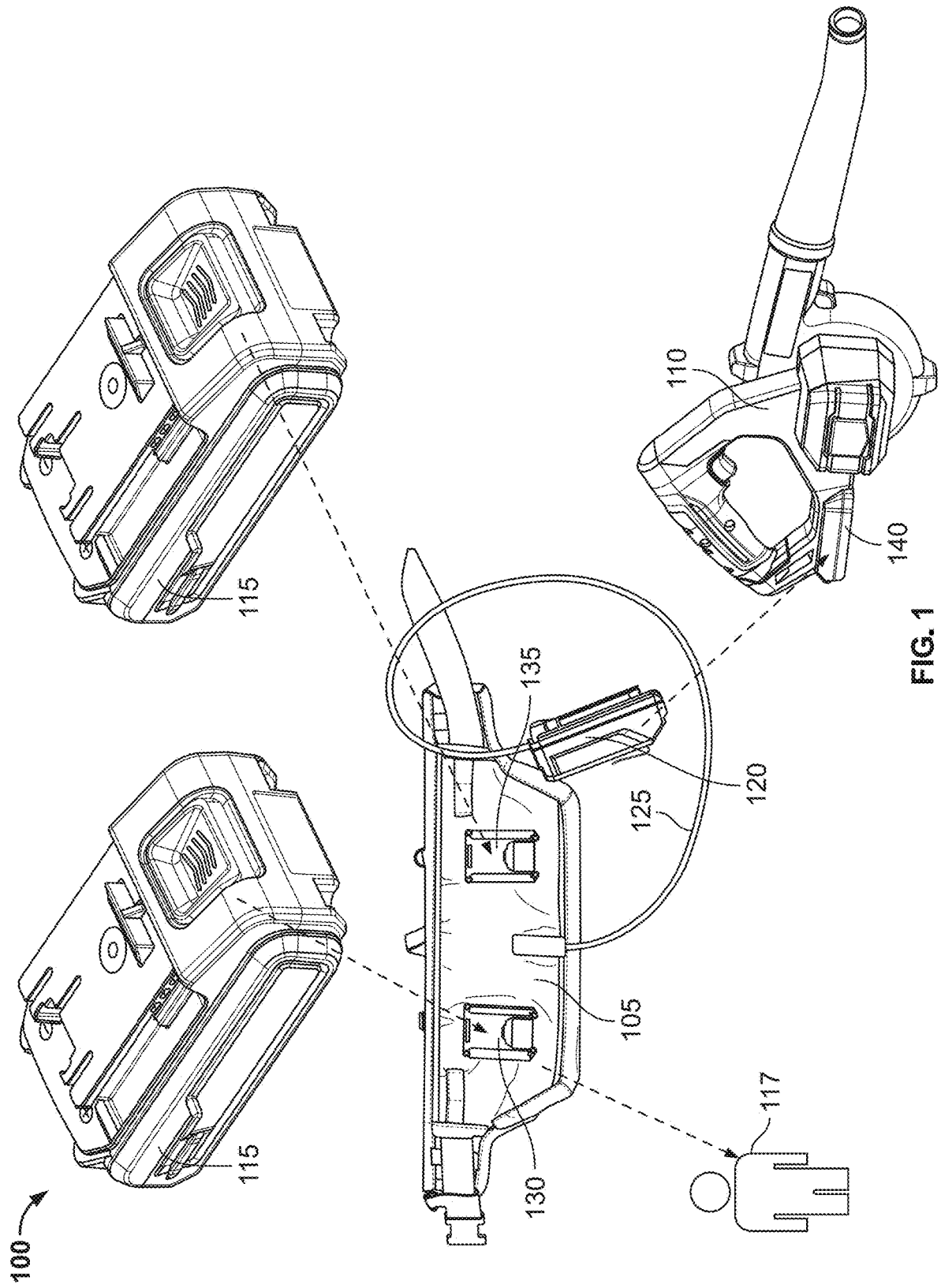
FIG. 1 illustrates a system including a wearable device, an adaptor, a power tool, and one or more battery packs in accordance with an embodiment of the disclosure.

FIG. 1 illustrates a system 100 including a device 105, a power tool 110, and one or more battery packs 115 according to some embodiments. The device 105 may be a wearable device (e.g., a belt, a harness, a backpack, etc.) such that the device 105 may be worn by a user 117. The power tool 110, although shown as a blower, may be any power tool (e.g., a drill, a fastener driver, an impact driver, a reciprocating saw, etc.) able to receive power from the one or more battery packs 115. In some examples, the power tool 110 may be an outdoor power tool (e.g., a blower, a trimmer, an edger, a mower, a chainsaw, etc.) or any outdoor power equipment able to receive power from the one or more battery packs 115. The one or more battery packs 115 may each include one or more battery cells, for example, lithium-ion battery cells or any other suitable battery cells. The device 105 may be electrically and mechanically coupled to an adaptor 120 via a cable 125. The cable 125 may include a first connecting portion at a first end to electrically and mechanically couple the device 105 to the cable 125 and a second connecting portion at a second end to electrically and mechanically couple the cable 125 to the adaptor 120. The device 105 may further include a first device battery receptacle 130 and a second device battery receptacle 135. The first device battery receptacle 130 and the second device battery receptacle 135 may each receive a battery pack of the one or more battery packs 115. The one or more battery packs 115 may supply power to the adaptor 120 via the device 105 through the cable 125. The adaptor 120 may be electrically and mechanically coupled to the power tool 110 via a power tool battery receptacle 140. Once the adaptor 120 is coupled to the power tool 110 via the power tool battery receptacle 140, the power tool 110 may receive operational power from the one or more battery packs 115 via the adaptor 120.

Figure 2:
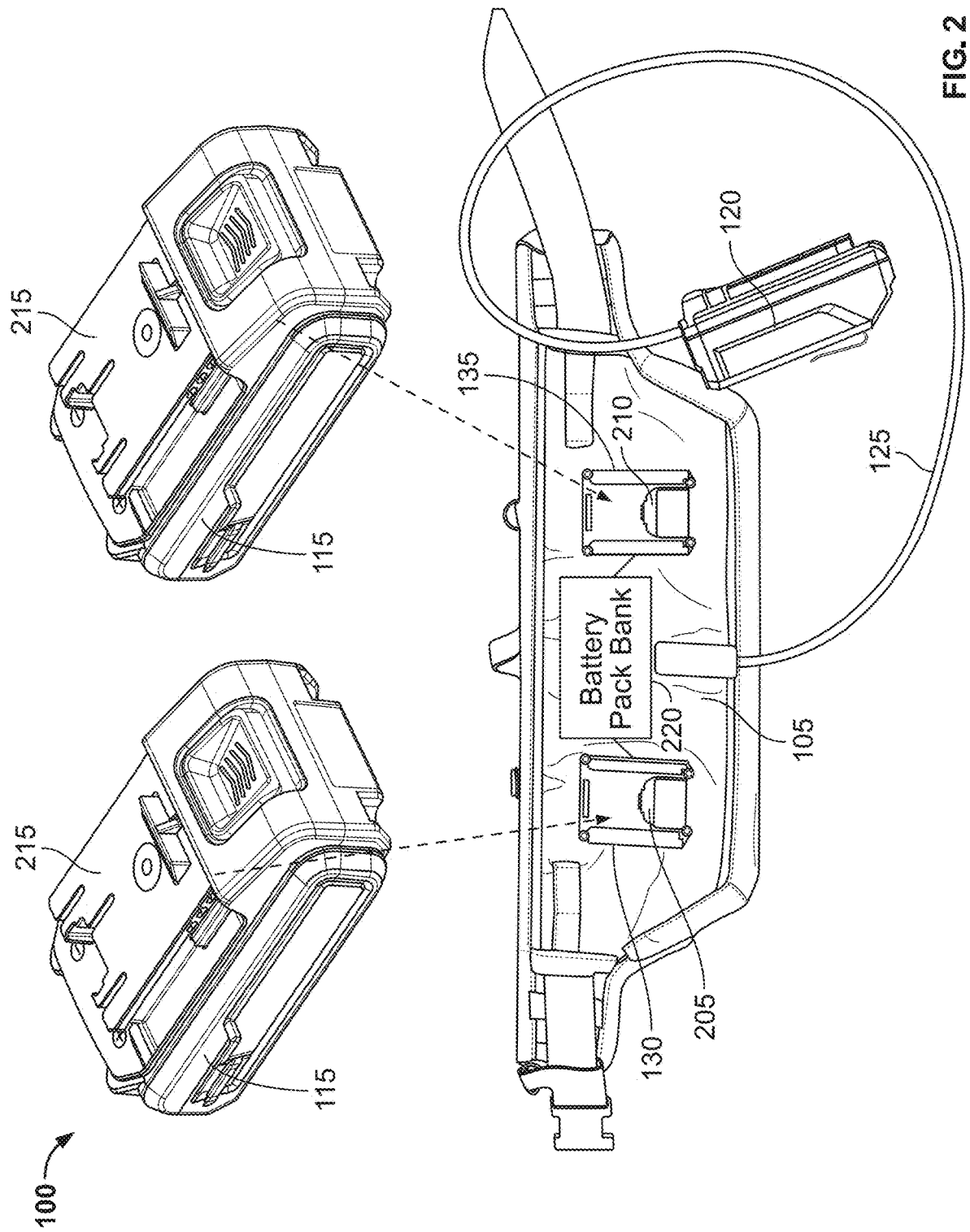
FIG. 2 illustrates a system including a wearable device, an adaptor, and one or more battery packs in accordance with an embodiment of the disclosure.

FIG. 2 illustrates the device 105 and the one or more battery packs 115 of the system 100 according to some embodiments. The first device battery receptacle 130 may include a first device battery terminal 205. The second device battery receptacle 135 may include a second device battery terminal 210. The first device battery terminal 205 and the second device battery terminal 210 may be electrically and mechanically coupled to the one or more battery packs 115 via one or more battery pack interfaces 215 of the one or more battery packs 115. As illustrated, in some embodiment, the device 105 may further include a battery pack bank 220. The one or more battery pack interfaces 215 may include a plurality of mechanical and/or electronic components capable of providing mechanical coupling and/or power to the device 105 (e.g., in some embodiments, to the battery pack bank 220 within the device 105). The battery pack bank 220 may receive power from the one or more battery packs 115 via the first device battery terminal 205 and the second device battery terminal 210 and transfer power to the adaptor 120. In some examples, the battery pack bank 220 supplies stored power, from the one or more battery packs 115, to the adaptor 120. In other embodiments, the device 105 may not include a battery pack bank 220. In such an embodiment, the one or more battery packs 115 supply power directly to the adaptor 120 once received by the first device battery terminal 205 and/or the second device battery terminal 210.

Figure 3:
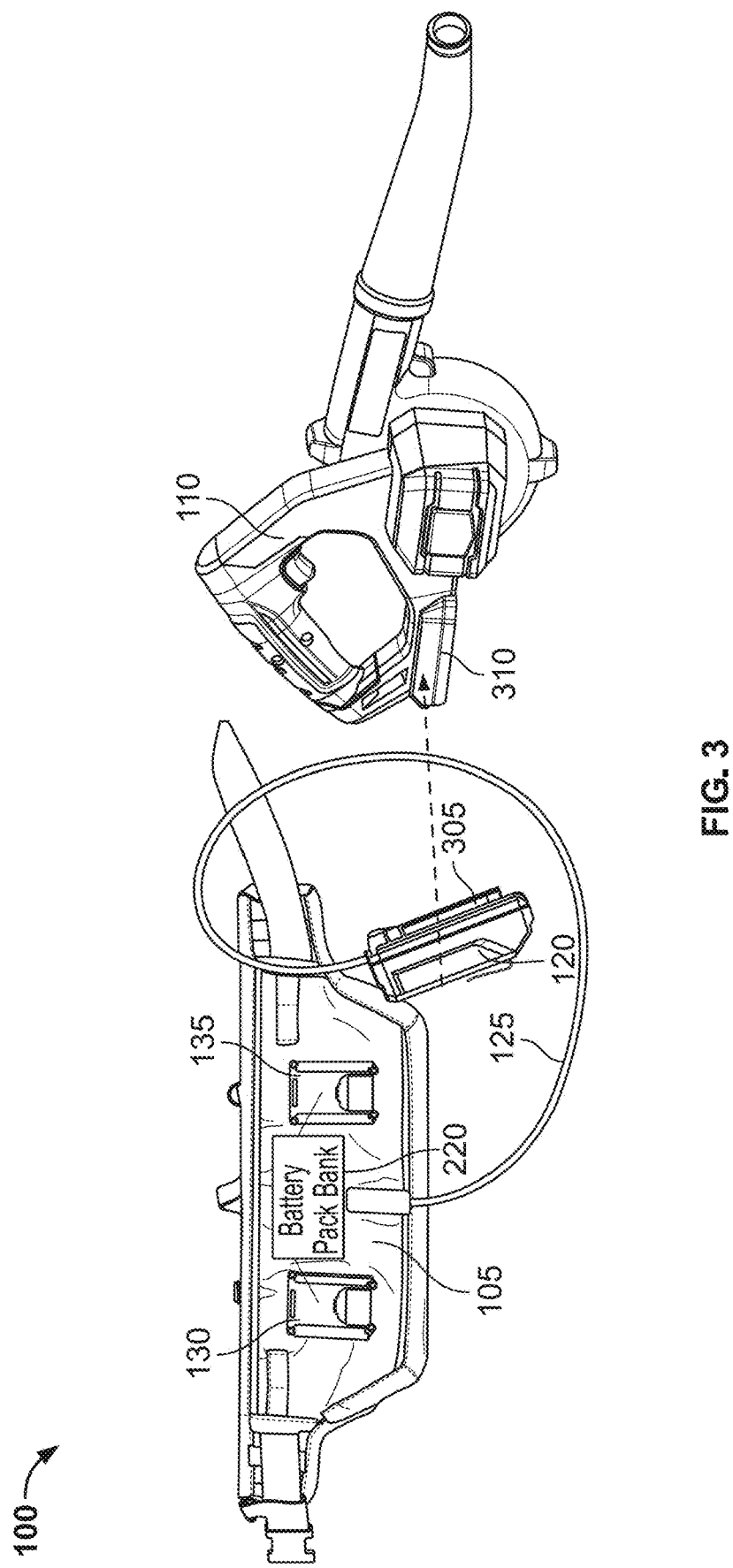
FIG. 3 illustrates a system including a wearable device, an adaptor, and a power tool in accordance with an embodiment of the disclosure.

FIG. 3 illustrates the device 105 and the power tool 110 of the system 100 according to some embodiments. The adaptor 120 may further include an adaptor interface 305 designed to electrically and mechanically couple the adaptor 120 to a power tool battery receptacle 310 of the power tool 110. The power tool battery receptacle 310 may include similar components (e.g., mechanical and/or electrical components) to the power tool battery receptacle 140. The power tool 110 may receive power via the power tool battery receptacle 310 from the adaptor 120. In some embodiments, the adaptor interface 305 is substantially similar (e.g., similar mechanical and/or electrical interface components) as the battery pack interfaces 215.

Figure 4:
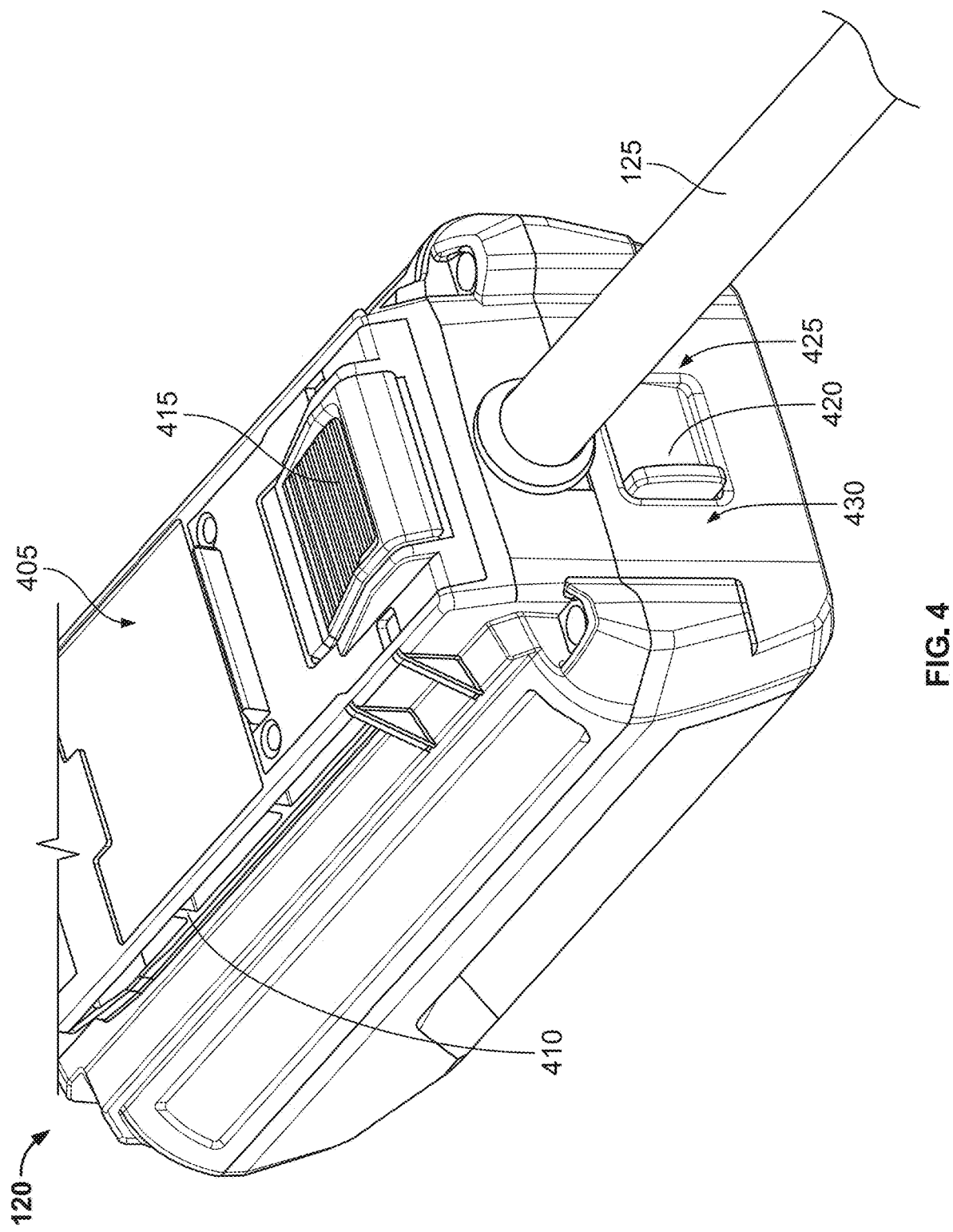
FIG. 4 is an enlarged perspective view of an adaptor of the systems of FIGS. 1, 2, and 3, in accordance with an embodiment of the disclosure.

FIG. 4 illustrates a perspective view of the adaptor 120 according to some embodiments. The adaptor 120 includes an adaptor interface 405. The adaptor interface 405 may include similar components of the adaptor interface 305 and is designed to be received by the power tool battery receptacle 310. The adaptor interface 405 may include one or more rails 410 designed to be received by one or more rails of the power tool battery receptacle 310. The adaptor interface 405 may further include a release mechanism 415. The release mechanism 415 is designed to be depressed to release the adaptor 120 from the power tool battery receptacle 310 when the adaptor 120 is coupled to the power tool battery receptacle 310. In some examples, the adaptor 120 may include a user interface 420. In some examples, the user interface 420 may be a switch, a button, a touch screen, and/or any other suitable user input. The user interface 420 may be movable between a first position 425 and a second position 430. If the user interface 420 is actuated to be in the first position 425, the adaptor 120 may operate in a first mode to supply power to the power tool 110. If the user interface 420 is actuated to be in the second position 430, the adaptor 120 may operate in a second mode to supply power to the power tool 110, wherein the second mode is different from the first mode. In some examples, the adaptor 120 includes a switching circuit having a plurality of electronic components (e.g., a switch, a contact, a relay, a field-effect transistor, etc.) to select either the first device battery receptacle 130 or the second device battery receptacle 135 to supply power from the one or more battery packs 115 to the power tool 110 based on the user interface 420 actuated to be in the first position 425 or the second position 430. In some examples, when the user interface 420 is actuated, the adaptor 120 may include an entirely mechanical switching configuration to select either the first device battery receptacle 130 or the second device battery receptacle 135. In some examples, the adaptor 120 may electrically disconnect the second device battery receptacle 135 if the first device battery receptacle 130 is selected. In other examples, the adaptor 120 may electrically disconnect the first device battery receptacle 130 if the second device battery receptacle 135 is selected.

Figure 5:
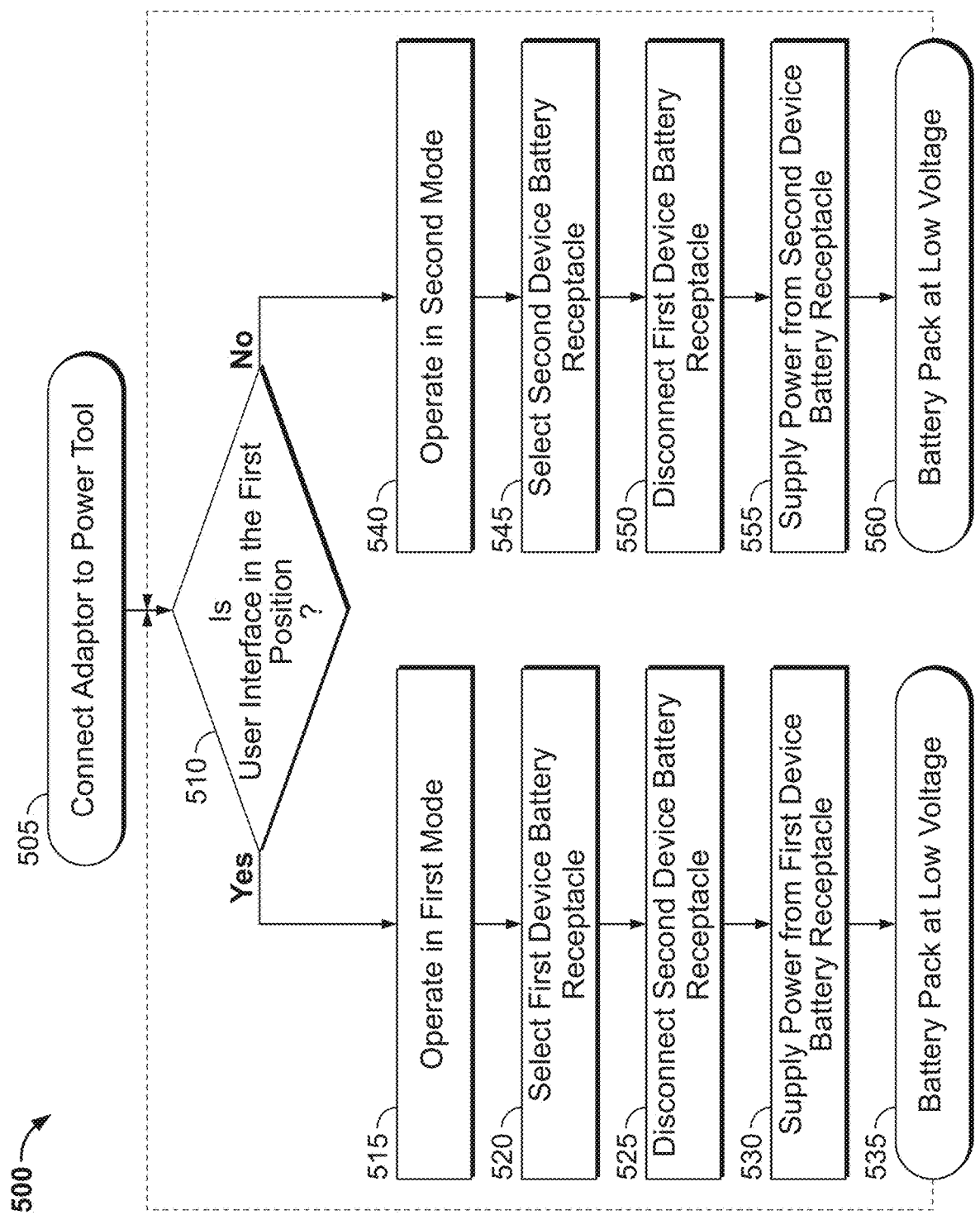
FIG. 5 is a flow chart of a method for switching between one or more battery packs of a system, in accordance with an embodiment of the disclosure.

FIG. 5 is a flowchart illustrating a method 500 for switching between one or more battery packs 115 of a system 100, according to some embodiments. It should be understood that the order of the steps disclosed in the method 500 could vary. For example, additional steps may be added to the process and not all of the steps may be required, or steps shown in one order may occur in a second order. In some examples, the adaptor 120 may perform the steps of method 500 via the switching circuit. The method 500 begins at step 505 when the power tool 110 receives the adaptor 120 (e.g., the power tool battery receptacle 140, 310 receives the adaptor interface 405). The method 500 then proceeds to step 510.

At step 510, adaptor 120 determines if the user interface 420 is located in the first position 425. If the user interface 420 is determined to be in the first position 425, the method 500 proceeds to step 515. At step 515, the adaptor 120 operates in the first mode, the method 500 proceeds to step 520. At step 520, during the first mode, the adaptor 120 selects the first device battery receptacle 130, via the switching circuit, to connect and supply power to the adaptor 120. The method 500 then proceeds to step 525. At step 525, in response to the adaptor 120 selecting the first device battery receptacle 130, the adaptor 120 disconnects the second device battery receptacle 135 such that the first device battery receptacle 130 is the only receptacle connected to the adaptor 120, the method 500 then proceeds to step 530. At step 530, the adaptor 120 supplies power from the first device battery receptacle 130 to the power tool 110, the method 500 then proceeds to step 535. At step 535, the battery pack within the first device battery receptacle 130 may be at a low voltage state and the adaptor 120 may be disconnected from the power tool 110 (and the operation of method 500 is completed), or the method 500 may revert back to step 510.

If the user interface 420 is determined to be in the second position 430 at step 510, the method 500 proceeds to step 540. At step 540, the adaptor 120 operates in the second mode, the method 500 then proceeds to step 545. At step 545, during the second mode, the adaptor 120 selects the second device battery receptacle 135, via the switching circuit, to connect and supply power to the adaptor 120. The method 500 then proceeds to step 550. At step 550, in response to the adaptor 120 selecting the second device battery receptacle 135, the adaptor 120 disconnects the first device battery receptacle 130 such that the second device battery receptacle 135 is the only receptacle connected to the adaptor 120, the method 500 then proceeds to step 555. At step 555, the adaptor 120 supplies power from the second device battery receptacle 135 to the power tool 110, the method 500 then proceeds to step 560. At step 560, the battery pack within the second device battery receptacle 135 may be at a low voltage state and the adaptor 120 may be disconnected from the power tool 110 (and the operation of method 500 is completed), or the method 500 may revert back to step 510.

Figure 6:
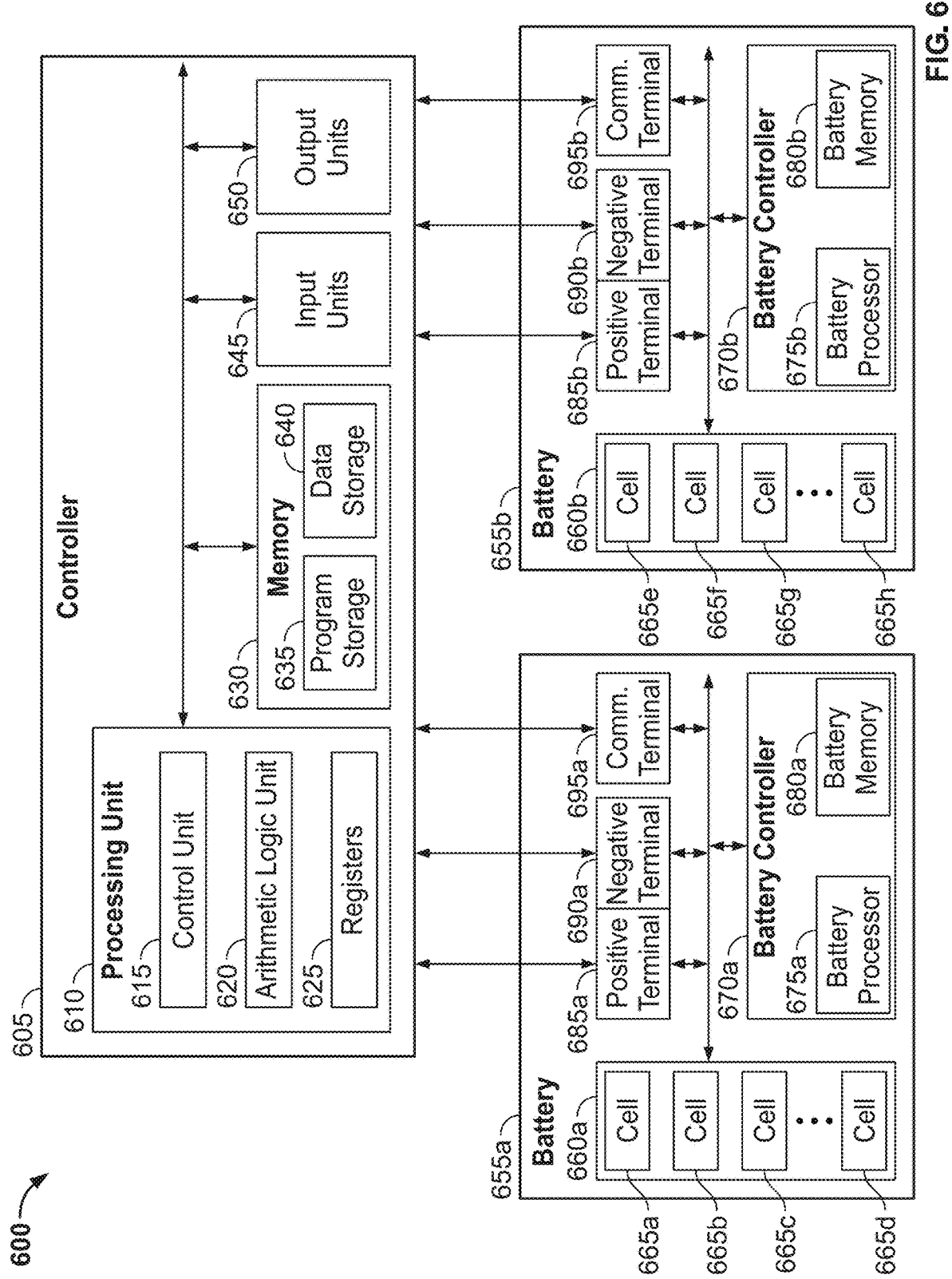
FIG. 6 is a block diagram of a wearable device system including a wearable device and a battery pack, in accordance with an embodiment of the disclosure.

In some examples, the adaptor 120 may include a control system 600 for suppling an amount of power to the power tool 110. FIG. 6 is a block diagram of the control system 600 of the adaptor 120, according to some examples. The control system 600 may include a controller 605, as well as other components not pictured in FIG. 6, for example a motor, a solenoid, and/or other mechanical and/or electrical components described above. The controller 605 may include a processing unit 610 comprising a control unit 615, an arithmetic logic unit 620, and one or more registers 625. The controller 605 may further include a memory 630 consisting of program storage 635 and/or data storage 640. The memory 630 may be flash memory, random access memory, solid state memory, another type of memory, or a combination of these types. The controller 605 may further include one or more input units 645 and/or output units 650. In some examples, the one or more input units 645 may be configured to receive a plurality of inputs such as a signal from the user interface 420, a mode switch signal, or a battery voltage signal. In some embodiments, the one or more output units 650 may be configured to transmit a plurality of outputs such as a signal to select a device battery pack receptacle, a signal to control a plurality of light-emitting diodes (LEDs), or a signal to control a plurality of FETs of the motor.

A first battery pack 655a, such as one of the one or more battery packs 115, may include a stack 660a consisting of one or more battery cells 665a-665d. In some examples, the one or more battery cells 665a-665d (e.g., lithium ion cells or cells having similar chemistry) are electrically connected to each other in a series-type manner. In other examples, the one or more battery cells 665a-665d are electrically connected to each other in a parallel-type manner. In still other examples, the one or more battery cells 665a-665d are electrically connected to each other in a combination of a series-type and a parallel-type manner. The first battery pack 655a may further include a battery controller 670a consisting of a battery processor 675a and a battery memory 680a. The first battery pack 655a may further include a positive battery terminal 685a and a negative battery terminal 690a. The positive battery terminal 685a and the negative battery terminal 690a may be configured to electrically and/or mechanically couple to the first device battery terminal 205 and/or the second device battery terminal 210 of the device 105. In some examples, the first battery pack 655a includes a communication terminal 695a, which may be configured to electrically, mechanically, and/or communicatively couple to one or more communication terminals of the device 105.

In some examples, such as the block diagram of FIG. 6, the one or more battery cells 665a-665d are connected to the battery controller 670a. The battery controller 670a controls the power delivered to the positive battery terminal 685a and the negative battery terminal 690a (for example, via control of a discharge field-effect transistor (FET), a charge FET, and/or other FETs located within the battery pack). In some embodiments, the battery controller 670a controls the power by allowing or prohibiting power. Additionally, in some embodiments, the battery controller 670a controls the power by allowing a percentage of power generated by the one or more battery cells 665a-665d to be output. In some embodiments, the amount of power delivered between the battery terminals 685a, 690a is approximately 100% of power possibly generated by the one or more battery cells 665a-665d.

A second battery pack 655b, such as one of the one or more battery packs 115, may include a stack 660b consisting of one or more battery cells 665e-665h. In some examples, the one or more battery cells 665e-665h (e.g., lithium ion cells or cells having similar chemistry) are electrically connected to each other in a series-type manner. In other examples, the one or more battery cells 665e-665h are electrically connected to each other in a parallel-type manner. In still other examples, the one or more battery cells 665e-665h are electrically connected to each other in a combination of a series-type and a parallel-type manner. The second battery pack 655b may further include a battery controller 670b consisting of a battery processor 675b and a battery memory 680b. The second battery pack 655b may further include a positive battery terminal 685b and a negative battery terminal 690b. The positive battery terminal 685b and the negative battery terminal 690b may be configured to electrically and/or mechanically couple to the first device battery terminal 205 and/or the second device battery terminal 210 of the device 105. In some examples, the second battery pack 655b includes a communication terminal 695b, which may be configured to electrically, mechanically, and/or communicatively couple to one or more communication terminals of the device 105.

In some examples, such as the block diagram of FIG. 6, the one or more battery cells 665e-665h are connected to the battery controller 670b. The battery controller 670b controls the power delivered to the positive battery terminal 685b and the negative battery terminal 690b (for example, via control of a discharge field-effect transistor (FET), a charge FET, and/or other FETs located within the battery pack). In some embodiments, the battery controller 670b controls the power by allowing or prohibiting power. Additionally, in some embodiments, the battery controller 670b controls the power by allowing a percentage of power generated by the one or more battery cells 665e-665h to be output. In some embodiments, the amount of power delivered between the battery terminals 685b, 690b is approximately 100% of power possibly generated by the one or more battery cells 665e-665h.

In some embodiments, the controller 605 receives a first battery voltage signal, indicative of a first voltage (or first battery supply voltage), from the battery terminals 685a, 690a. In such an embodiment, the controller 605 may receive the first battery voltage signal via a sensor located within the first battery pack 655a or the device 105. In other embodiments, the controller 605 receives the first battery voltage signal from the communication terminal 695a. The controller 605 may also receive a second battery voltage signal, indicative of a second voltage (or first battery supply voltage), from the battery terminals 685b, 690b. In such an embodiment, the controller 605 may receive the second battery voltage signal via a sensor located within the second battery pack 655b or the device 105. In other embodiments, the controller 605 receives the second battery voltage signal from the communication terminal 695a. In some embodiments, the controller 605 compares the first battery voltage signal to the second battery voltage signal. If the second battery pack 655*b* is supplying power to the adaptor 120 and the controller 605 determines that the first voltage is higher than the second voltage, the controller 605 may automatically switch from supplying power via the second battery pack 655*b* to supplying power via the first battery pack 655*a*. If the first battery pack 655*a* is supplying power to the adaptor 120 and the controller 605 determines that the second voltage is higher than the first voltage, the controller 605 may automatically switch from supplying power via the first battery pack 655*a* to supplying power via the second battery pack 655*b*. In some embodiments, automatically switching from one battery pack to another battery pack may be done by switching from the first mode to the second mode or vice versa.

Figure 7:
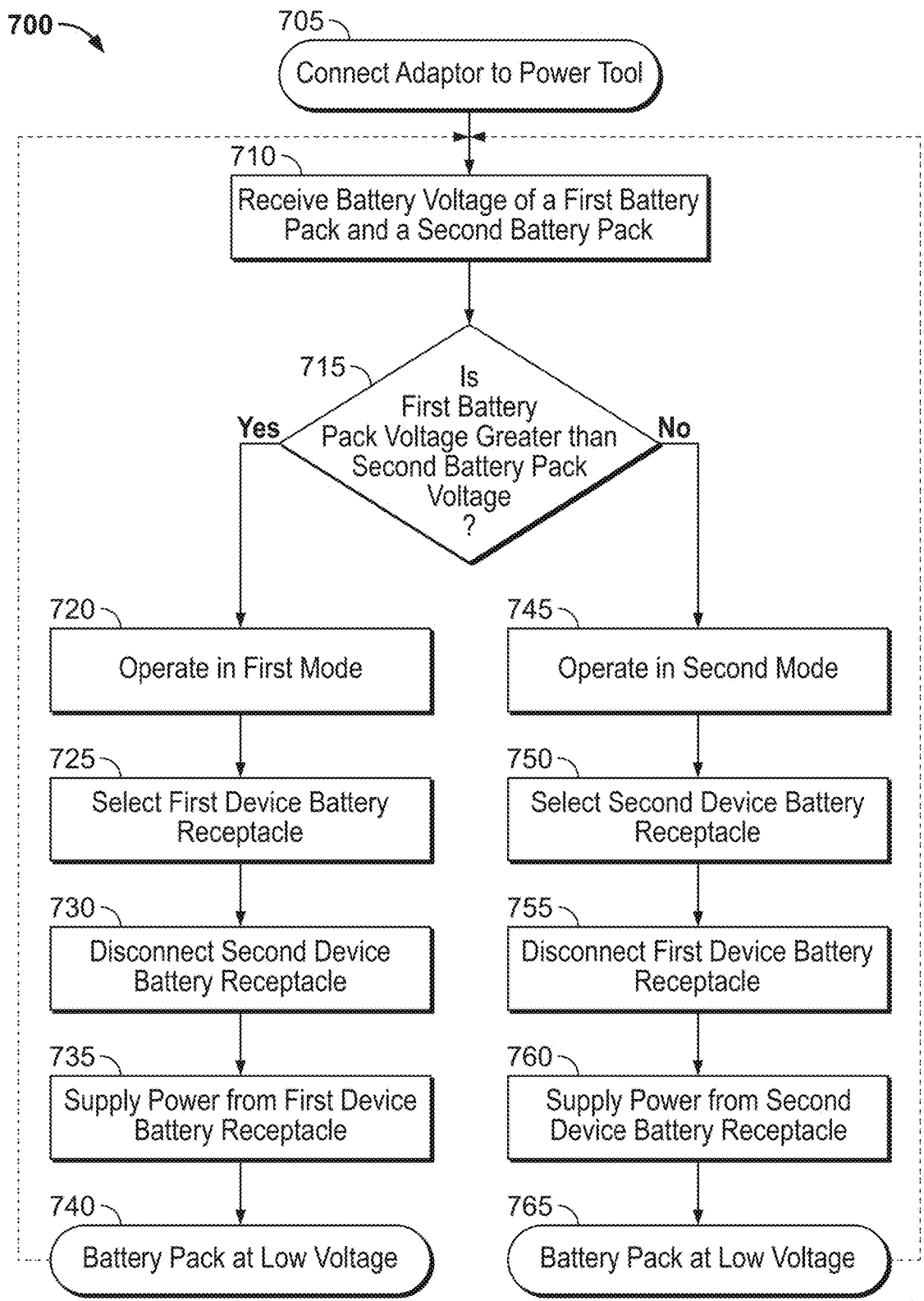
FIG. 7 is a flow chart of a method for switching between one or more battery packs of a system, in accordance with an embodiment of the disclosure.

FIG. 7 is a flowchart illustrating a method 700 for switching between one or more battery packs 115 of a system 100, according to some embodiments. It should be understood that the order of the steps disclosed in the method 700 could vary. For example, additional steps may be added to the process and not all of the steps may be required, or steps shown in one order may occur in a second order. In some examples, the adaptor 120 may perform the steps of method 700 via the controller 605. The method 700 begins at step 705 when the power tool 110 receives the adaptor 120 (e.g., the power tool battery receptacle 140, 310 receives the adaptor interface 405). The method 700 then proceeds to step 710.

At step 710, the controller 605 receives a first battery voltage signal from the first battery pack 655*a* and a second battery voltage signal from the second battery pack 655*b*. The controller 605 may determine a first voltage corresponding to the first battery pack 655*a* based on the first battery voltage signal. The controller 605 may also determine a second voltage corresponding to the second battery pack 655*b* based on the second battery voltage signal. The method 700 then proceeds to step 715. At step 715, the controller 605 determines if the first voltage is greater than the second voltage. If the first voltage is determined to be greater than the second voltage, the method 700 proceeds to step 720.

At step 720, the controller 605 operates in the first mode, the method 700 proceeds to step 725. At step 725, during the first mode, the controller 605 automatically selects the first device battery receptacle 130 (e.g., the first device battery receptacle 130 connected to the first battery pack 655*a*) to connect and supply power to the adaptor 120. The method 700 then proceeds to step 730. At step 730, in response to the controller 605 automatically selecting the first device battery receptacle 130, the controller 605 automatically disconnects the second device battery receptacle 135 such that the first device battery receptacle 130 is the only receptacle connected to the adaptor 120, the method 700 then proceeds to step 735. At step 735, the adaptor 120 supplies power from the first device battery receptacle 130 to the power tool 110, the method 700 then proceeds to step 740. At step 740, the first battery pack 655*a* within the first device battery receptacle 130 may be at a low voltage state and the adaptor 120 may be disconnected from the power tool 110 (and the operation of method 700 is completed), or the method 700 may revert back to step 710. In some embodiments, when the first battery pack 655*a* is at a low voltage state, the controller 605 may automatically switch to the second device battery receptacle 135 to supply power to the power tool 110 via the second battery pack 655*b*.

If the second voltage is determined, by the controller 605, to be greater than the first voltage at step 715, the method 700 proceeds to step 745. At step 745, the controller 605 operates in the second mode, the method 700 then proceeds to step 750. At step 750, during the second mode, the controller 605 automatically selects the second device battery receptacle 135 (e.g., the second device battery receptacle 135 connected to the second battery pack 655*b*) to connect and supply power to the adaptor 120. The method 700 then proceeds to step 755. At step 755, in response to the controller 605 automatically selecting the second device battery receptacle 135, the controller 605 automatically disconnects the first device battery receptacle 130 such that the second device battery receptacle 135 is the only receptacle connected to the adaptor 120, the method 700 then proceeds to step 760. At step 760, the adaptor 120 supplies power from the second device battery receptacle 135 to the power tool 110, the method 700 then proceeds to step 765. At step 765, the second battery pack 655*b* within the second device battery receptacle 135 may be at a low voltage state and the adaptor 120 may be disconnected from the power tool 110 (and the operation of method 700 is completed), or the method 700 may revert back to step 710. In some embodiments, when the second battery pack 655*b* is at a low voltage state, the controller 605 may automatically switch to the first device battery receptacle 130 to supply power to the power tool 110 via the first battery pack 655*a*.

Figure 8:
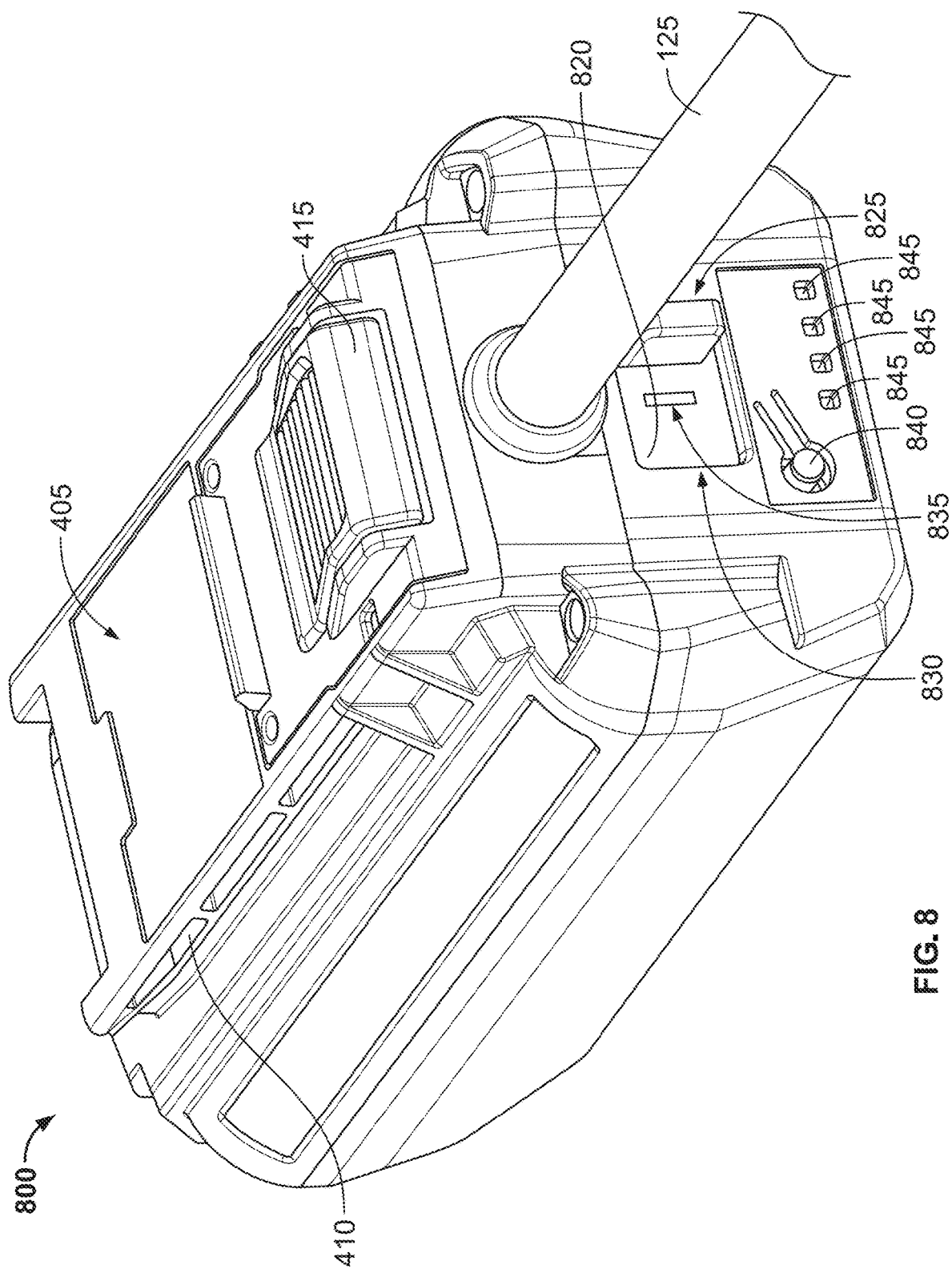
FIG. 8 is an enlarged perspective view of an adaptor of the systems of FIGS. 1, 2, and 3, in accordance with an embodiment of the disclosure.

FIG. 8 illustrates a perspective view of an adaptor 800 according to some embodiments. In some examples, the adaptor 800 may include similar components of the adaptor 120, shown in FIG. 4. For example, the adaptor 800 may include the adaptor interface 405, the one or more rails 410, and the release mechanism 415. In some examples, the adaptor 800 may further include a user interface 820. The user interface 820 may be a switch, a button, a touch screen, and/or any other suitable user input. In the illustrated embodiment, the user interface 820 is movable between a first position 825, a second position 830, and a third position 835. In some examples, the first position 825 and the second position 830 may be the same as the first position 425 and the second position 430, respectively, of the switch 420 of FIG. 4. For example, if the user interface 820 is actuated to be in the first position 825, the adaptor 800 may operate in the first mode to supply power to the power tool 110. If the user interface 820 is actuated to be in the second position 830, the adaptor 800 may operate in the second mode to supply power to the power tool 110, wherein the second mode is different from the first mode. If the user interface 820 is actuated to be in the third position 835 (e.g., a neutral position), the adaptor 800 may operate in a third mode, wherein the third mode is different from the first mode and the second mode. When the adaptor 800 operates in the third mode, the adaptor 800 may not supply power to the power tool 110. In some examples, the third position 835 may be located between the first position 825 and the second position 830. In some examples, the third position 835 may be located equidistant between the first position 825 and the second position 830.

In some examples, the adaptor 800 includes a switching circuit having a plurality of electronic components (e.g., a switch, a contact, a relay, a field-effect transistor, etc.) to select either the first device battery receptacle 130 or the second device battery receptacle 135 to supply power from the one or more battery packs 115 to the power tool 110 based on the user interface 820 actuated to be in the first position 825 or the second position 830. In some examples, when the user interface 820 is actuated, the adaptor 800 may include an entirely mechanical switching configuration to select either the first device battery receptacle 130 or the second device battery receptacle 135. In some examples, the adaptor 800 may electrically disconnect the second device battery receptacle 135 if the first device battery receptacle 130 is selected. In other examples, the adaptor 800 may electrically disconnect the first device battery receptacle 130 if the second device battery receptacle 135 is selected. In even further examples, the adaptor 800 may electrically disconnect the first device battery receptacle 130 and the second device battery receptacle 135 if the user interface 820 is actuated to be in the third position 835.

In some examples, the adaptor 800 may include a second user interface 840 and a plurality of light-emitting diodes ("LEDs") 845. In some examples, although illustrated as a button in FIG. 8, the second user interface 840 may be a switch, a touch screen, and/or any other suitable user input. In some embodiments, when the second user interface 840 is depressed, one or more of the plurality of LEDs 845 are illuminated to indicate the state-of-charge ("SOC") of the one or more battery packs 115 connected to the selected device battery receptacle based on the position of the user interface 820. For example, if the user interface 820 is actuated to be in the first position 825 and the adaptor 800 operates in the first mode, wherein the first device battery receptacle 130 is selected, and the second user interface 840 is depressed, one or more of the plurality of LEDs 845 may be illuminated to indicate the SOC of the one or more battery packs 115 connected to the first device battery receptacle 130. In some examples, the plurality of LEDs 845 may be similar to a battery fuel gauge, wherein the plurality of LEDs 845 indicate the amount of charge remaining of the one or more battery packs 115. In some embodiments, the plurality of LEDs 845 may provide other indications, in addition to or in lieu of SOC, for example, error indications of the system 100 including error indications related to, or concerning, the device 105, the power tool 110, and the one or more battery packs 115. In some embodiments, user interface 830 and user interface 840 may be combined into a single user interface (for example, but not limited to, a touch screen interface).

Although the present subject matter has been described in detail with reference to certain preferred embodiments, variations and modifications exist within the scope of one or more independent aspects of the present subject matter as described.

What is claimed is:

1. A system for use with a power tool having a power tool battery receptacle, the system comprising:
   a device configured to be wearable by a user, the device having a first device battery receptacle and a second device battery receptacle; and
   an adaptor connected to the device and including a user interface and an adapter interface, the adapter interface configured to be received by the power tool battery receptacle, the adaptor configured to:
      supply power, via the first device battery receptacle, when the user interface is in a first mode; and
      supply power, via the second device battery receptacle, when the user interface is in a second mode.

2. The system of claim 1, further comprising:
   one or more battery packs configured to be received by at least one selected from the group consisting of the power tool battery receptacle, the first device battery receptacle, and the second device battery receptacle.

3. The system of claim 2, wherein the one or more battery packs includes:
   a first battery pack configured to be received by the first device battery receptacle; and
   a second battery pack configured to be received by the second device battery receptacle.

4. The system of claim 1, wherein the adaptor is further configured to:
   operate, in response to the user interface in a first position, in the first mode;
   select, in response to the first mode, the first device battery receptacle; and
   supply power, via the first device battery receptacle, to the power tool.

5. The system of claim 4, wherein the adaptor is further configured to:
   disconnect, in response to supplying power to the power tool via the first device battery receptacle, the second device battery receptacle from the adaptor.

6. The system of claim 4, wherein the adaptor is further configured to:
   operate, in response to the user interface in a second position, in the second mode;
   select, in response to the second mode, the second device battery receptacle; and
   supply power, via the second device battery receptacle, to the power tool.

7. The system of claim 6, wherein the adaptor is further configured to:
   disconnect, in response to supplying power to the power tool via the second device battery receptacle, the first device battery receptacle from the adaptor.

8. The system of claim 1, wherein the power tool is an outdoor power tool.

9. A device configured to be wearable by a user, the device comprising:
   an adaptor including a user interface, the adaptor configured to:
      supply power, via a first device battery receptacle of the device, when the user interface is in a first mode; and
      supply power, via a second device battery receptacle of the device, when the user interface is in a second mode.

10. The device of claim 9, wherein the user interface is a switch located on the adaptor.

11. The device of claim 10, wherein the switch includes a first position and a second position.

12. The device of claim 11, wherein the adaptor is further configured to:
    operate, in response to the switch in the first position, in the first mode; and
    operate, in response to the switch in the second position, in the second mode.

13. The device of claim 9, wherein the first device battery receptacle is configured to receive a first battery pack, and wherein the second device battery receptacle is configured to receive a second battery pack.

14. The device of claim 9, wherein the adaptor is further configured to:
    operate, in response to the user interface in a first position, in the first mode;
    select, in response to the first mode, the first device battery receptacle; and
    supply power, via the first device battery receptacle, to a power tool connected to the device.

15. The device of claim 14, wherein the adaptor is further configured to:
    disconnect, in response to supplying power to the power tool via the first device battery receptacle, the second device battery receptacle from the adaptor.

16. The device of claim 14, wherein the adaptor is further configured to:
- operate, in response to the user interface in a second position, in the second mode;
- select, in response to the second mode, the second device battery receptacle; and
- supply power, via the second device battery receptacle, to the power tool.

17. The device of claim 16, wherein the adaptor is further configured to:
- disconnect, in response to supplying power to the power tool via the second device battery receptacle, the first device battery receptacle from the adaptor.

* * * * *